(12) United States Patent
Guha

(10) Patent No.: US 8,849,124 B2
(45) Date of Patent: Sep. 30, 2014

(54) BOUNDLESS READING OF INFORMATION BITS WITH A SINGLE PHOTON

(75) Inventor: Saikat Guha, Everett, MA (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 232 days.

(21) Appl. No.: 13/464,253

(22) Filed: May 4, 2012

(65) Prior Publication Data

US 2013/0292472 A1 Nov. 7, 2013

(51) Int. Cl.
*H04B 10/70* (2013.01)

(52) U.S. Cl.
USPC .......................................... 398/140; 398/118

(58) Field of Classification Search
CPC ..................................................... H04B 10/70
USPC ............................................... 398/140, 118
See application file for complete search history.

(56) References Cited

U.S. PATENT DOCUMENTS 8,242,428 B2 * 8/2012 Meyers et al. ............. 250/208.1
2010/0232279 A1 * 9/2010 Stevenson et al. ............ 369/100

OTHER PUBLICATIONS

Guha, "Structured optical receivers to attain superadditive capacity and the Hoevo limit", Jan. 7, 2011.*
Guha, "On quantum limit of optical communications:concatenated codes and joint-detection receivers", Feb. 9, 2011.*
Bisio, A. et al., Tradeoff Between Energy and Error in the Discrimination of Quantum-Optical Devices, Physical Review A 84, 012310, American Physical Society, 2011, 6 pgs.
Invernizzi, C. et al., Optimal Detection of Losses by Thermal Probes, Physical Review A 84, 022334, American Physical Society, 2011, 12 pgs.
Lupo, C. et al., Enhanced Quantum Communication via Optical Refocusing, Physical Review A 84, 010303, American Physical Society, 2011, 4 pgs.
Wilde, M. et al., Explicit Capacity-Achieving Receivers for Optical Communication and Quantum Reading, IEEE International Symposium on Information Theory Proceedings, 2012, 5 pgs.
Arno, M. et al., Experimental Implementation of Unambiguous Quantum Reading, Physical Review A 85, 012308, American Physical Society, 2012, 7 pgs.
Zhukovsky, S. et al., Generation of Maximally-Polarization-Entangled Photons on a Chip, Physical Review A 85, 013838, American Physical Society, 2012, 6 pgs.
Nair, R. et al., Optimal Quantum States for Image Sensing in Loss, Physical Review Letters PRL 107, 193602, American Physical Society, 2011, 5 pgs.
Hirota, Osamu, Quasi Bell State of Entangled Coherent States in Quantum Reading, arXiv:1108.4163v1 [quant-ph], Aug. 21, 2011, 3 pgs.
Tsang, Mankei, Cavity Quantum Electo-Optics. II. Input-Output Relations between Traveling Optical and Microwave Fields, Physical Review A 84, 043845, American Physical Society, 2011, 8 pgs.
Hirota, O. et al, Effectiveness of Entangled Coherent State in Quantum Metrology, arXiv:1108.1517v4 [quant-ph], Jan. 8, 2012, 4 pgs.

* cited by examiner

*Primary Examiner* — Leslie Pascal
(74) *Attorney, Agent, or Firm* — Christie, Parker & Hale, LLP

(57) ABSTRACT

An optical imaging system includes a transmitter configured to generate spatially entangled quantum states of light to probe reflective targets, a target configured to reflect the spatially entangled quantum states of light and a receiver configured to receive and detect the spatially entangled quantum states of light, thereby decoding a message encoded in a memory.

20 Claims, 12 Drawing Sheets

FIG. 3: Photon information efficiency (PIE) versus the mean photon number $N_S$ used to interrogate each memory cell.

BOUNDLESS READING OF INFORMATION BITS WITH A SINGLE PHOTON

GOVERNMENT LICENSE RIGHTS

This invention was made with Government support under Government Contract Number HR0011-10-C-0162 to DARPA. The Government has certain rights in this invention.

BACKGROUND

The present invention relates to optical memory, and more specifically, to systems and methods for reading information bits with a spatially entangled state of light, more specifically, using a single photon in a uniform coherent superposition of being present in multiple spatial locations.

Optically encoded media such as optical discs, optical memory and barcodes are ubiquitous. The surface of an optical disc, for example, contains a long spiral track of data, along which, there are flat reflective areas called land and non-reflective pits (also called bumps). A flat reflective area represents a binary 1, while a non-reflective bump represents a binary 0. The optical reader drive shines a laser at the surface of the optical disc. Pits and lands have the same light-reflecting surface, but pits reflect the read-laser's light in a diffuse way and thus look relatively dark compared to the land areas. The photocurrent of the detector tracks the intensity profile of the reflected light that is captured by the entrance pupil of the optical pickup. The drive converts this photocurrent into 1s and 0s by signal processing, to read digital data from the disc.

Fundamentally, performance of any optical communication or imaging system is limited by noise of quantum-mechanical origin, and optical reading of a coded memory is no exception. In order to understand the ultimate performance bounds of an optical imaging system that is limited only by the laws of quantum physics, an analysis within a full quantum mechanical framework is indispensable. However, currently there remains a gap between achievable limits with classical and quantum transceivers.

SUMMARY

Exemplary embodiments include an optical imaging system, including a transmitter configured to generate spatially entangled quantum states of light to probe reflective targets, a target configured to reflect the spatially entangled quantum states of light and a receiver configured to receive and detect the spatially entangled quantum states of light, thereby decoding a message encoded in a memory.

Additional exemplary embodiments include an optical imaging system, including a light source configured to generate light, a W-state transmitter optically coupled to the light source and configured to place the light in a spatially entangled quantum state, a binary phase Hadamard coded optical memory in optical communication with the W-state transmitter and configured to modulate the light in the quantum entangled state, a receiver configured to coalesce the modulated light in the quantum entangled state from a coherent superposition of multiple spatial locations to a light state and an array of light detectors configured to detect the light state.

Further exemplary embodiments include an optical reading method, including generating light, placing the light in spatially entangled quantum state of light, reflecting the light from an optically encoded medium, coalescing the light at an array of light detectors and decoding bits of information from the light.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
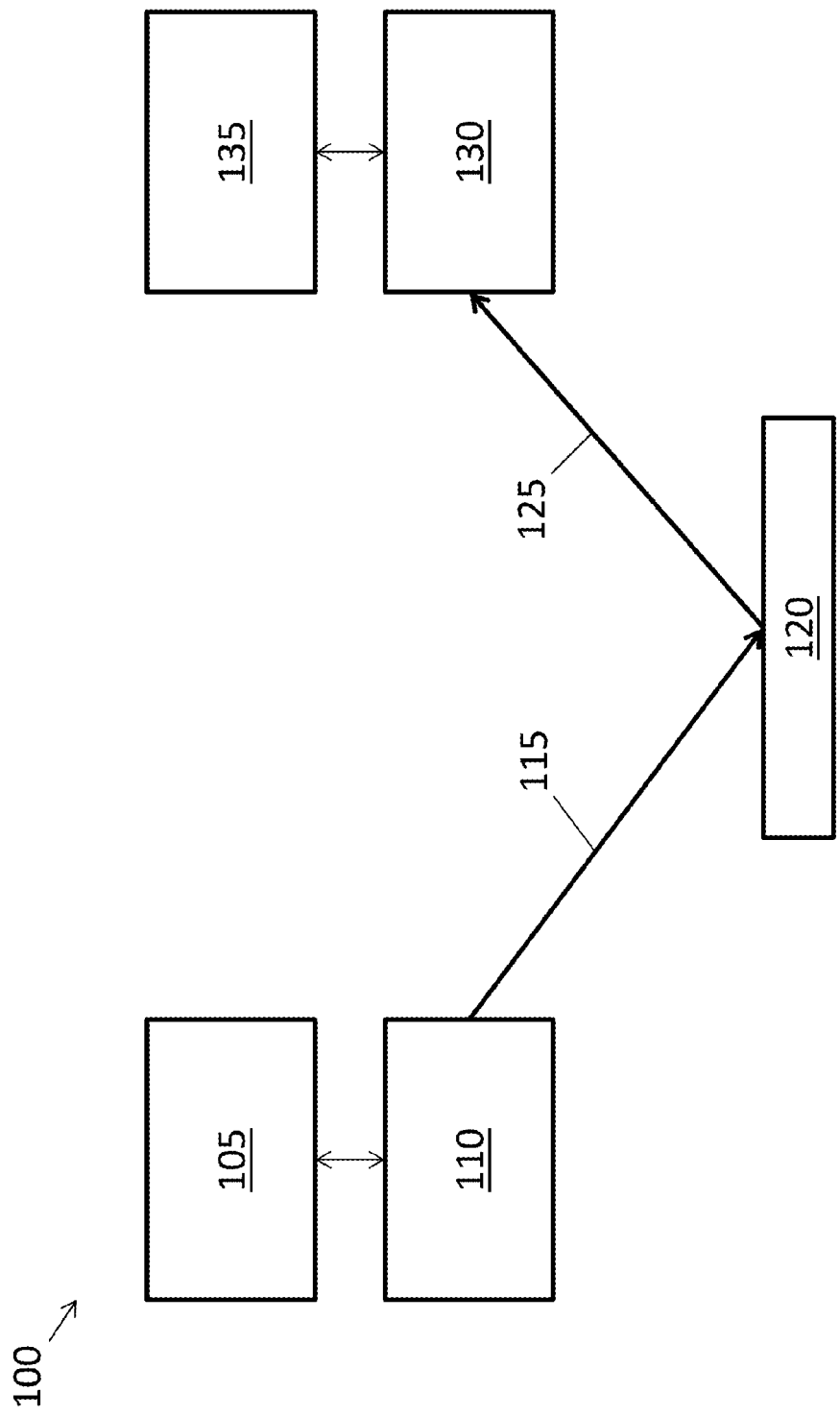
FIG. 1 illustrates an exemplary optical imaging system.

FIG. 1 illustrates an exemplary optical imaging system 100. The system includes a single photon source 105 configured to generate single photons within the system 100. The single photon source 105 can be any suitable device such as, but not limited to, a heralded spontaneous parametric down-conversion (SPCD) source, a nitrogen-vacancy center (N-V center) diamond, and a quantum dot. It will be appreciated that the single photon source 105 can be any suitable device for generating single photons. The system 100 further includes a transmitter 110 configured to receive the single photons and configure the single photons into an entangled quantum state. In exemplary embodiments, quantum entanglement occurs when the single photons interact within the transmitter 110, which places the single photon in multiple but separate phase and spatial locations within the transmitter 110, and is also described by the same quantum state. As described further herein, the transmitter 110 is thus capable of receiving the single photon from the single photon source 105 and places the single photon in a coherent superposition of multiple phase and spatial locations. As such, the transmitter 110 transforms a single photon light signal 115 (i.e., probe light) into the coherent superposition quantum state as described above.

As described further herein, the transmitter 110 includes an internal infrastructure such as 50-50 beamsplitters in an interferometric set up. It will be appreciated that the internal infrastructure can be other optical mode transformation devices other than beamsplitters. As such, the internal infrastructure can be any spatial light modulators, arrays of spatial light modulators, or volume holograms, for a very complicated mode transformation of some quantum source of light, in order to generate a transmitter state for optical imaging. As described further herein, the transmitter 110 can be any transmitter configured to generate a quantum entangled photon, such as but not limited to a W-state transmitter. The system 100 further includes an optically encoded medium 120 onto which the single photon light signal 115 interacts and is reflected into a modulated single photon light signal 125. The optically encoded medium can be any optically encoded medium such as but not limited to compact disks (CD), digital video disks (DVDs), bar codes and any optically encoded memory. In addition, the coding of the optically encoded medium 120 can be any suitable encoding such as but not limited to binary phase encoding. One illustrative example described herein is a binary phase encoding using a binary Hadamard code. The system 100 further includes a receiver 130 configured to receive the modulated single photon light signal 125, which is still in a quantum entangled state. By interacting with a similar infrastructure (i.e., 50-50 beamsplitters in an interferometric set up) within the receiver 130, the modulated single photon light signal 125 coalesces into a single photon in a single quantum state. The system 100 further includes single photon detectors 135 configured to detect and read the single photon from the receiver 130. The single photon detector 135 can be any suitable single photon detector such as, but not limited to, a high detection efficiency single photon detector (i.e., a transition edge sensor (TES) detector), a high speed, lower detection efficiency detector (i.e., a superconducting single photon detector (SSPD)), and a low detection efficiency, high speed detector (i.e., a silicon avalanche photo diode (APD)). The system 100 can be modified in various manners as described herein and can implement various optical reading methods as further described herein.

As further described herein, the system 100 can read any number of bits of information. The system 100 is configured to encode information using M spatially-well-resolved orientations, such that a well-collimated single-photon beam, reflected off of the optically encoded medium 120, detected via an array of single photon detectors 135 one matched to every well-resolved spatial position of the optically encoded medium 120, which will also be known as a pixel of the optically encoded medium. The spatially well-resolved orthogonal modes can be replaced by any set of M orthogonal space-time-polarization modes of light that the target (memory) can excite using the incident single photon state. For the W-state transmitter example, those orthogonal modes are spatially-overlapping mutually-orthogonal spatial modes corresponding to the Hadamard codebook (just like the mutually-orthogonal temporal chip waveforms of a spread-spectrum system).

In exemplary embodiments, the systems and methods described herein reading classical data encoded in memory (which can include reflective pixels) that passively modulates the amplitude and phase of the probe light. In exemplary embodiments, the systems and methods described herein are implemented to read the classical data with no fundamental upper limit to the number of information bits that can be read reliably per expended probe photon. Conventionally, by implementing a noiseless coherent-state (i.e., classical laser light) probe, an on-off amplitude-modulation pixel encoding, and direct (intensity) detection at the receiver (an idealized model of commercial CD/DVD disc drives), the highest photon information efficiency achievable, is about 0.5 bit per transmitted photon. In exemplary embodiments, a coherent-state probe light (i.e., light produced by a conventional laser) can read unlimited bits per photon when the receiver makes joint (inseparable) measurements on the reflected light from a large block of memory cells, and when phase modulation occurs at the memory cells. Furthermore, the systems and methods described herein implement a quantum entangled transmitter (e.g., a "W-state" transmitter), which is a spatially-entangled non-classical light probe, which can read any number of error-free bits of information, using a single photon prepared in a coherent superposition of being in multiple spatial locations, a Hadamard coded binary-phase modulation by the memory cells, and a joint detection receiver constructed using an array of 50-50 beamsplitters and a bank of single photon detectors. As such, in exemplary embodiments, entangled states of light are implemented to obtain higher photon efficiency (i.e., the number of bits of information read per expended photon) in task-specific coded imaging, at lower error rates for a given target complexity, for imaging a target, as compared to conventional optical transmitters (e.g., lasers) and receivers (e.g., homodyne detection, heterodyne detection and direct detection receivers).

As described above, entangled states of light occur when a photon is in a coherent superposition of being in multiple different spatial locations at once, or more generally, in a coherent superposition of being in one of many orthogonal potentially overlapping spatial-temporal field modes at once. Conventional code, target and joint-detection receiver complexity required by a coherent state transmitter to achieve comparable photon efficiency performance is shown to be much higher as compared to the exemplary systems described herein, such as the system 100 that can include W-state transmitter. As such, the exemplary system 100 can read any number of bits of information from a coded optically readable digital memory with sufficiently many (e.g., binary phase encoded) pixels, with zero probability of error, by preparing a single photon in a spatially-entangled quantum state.

Figure 2:
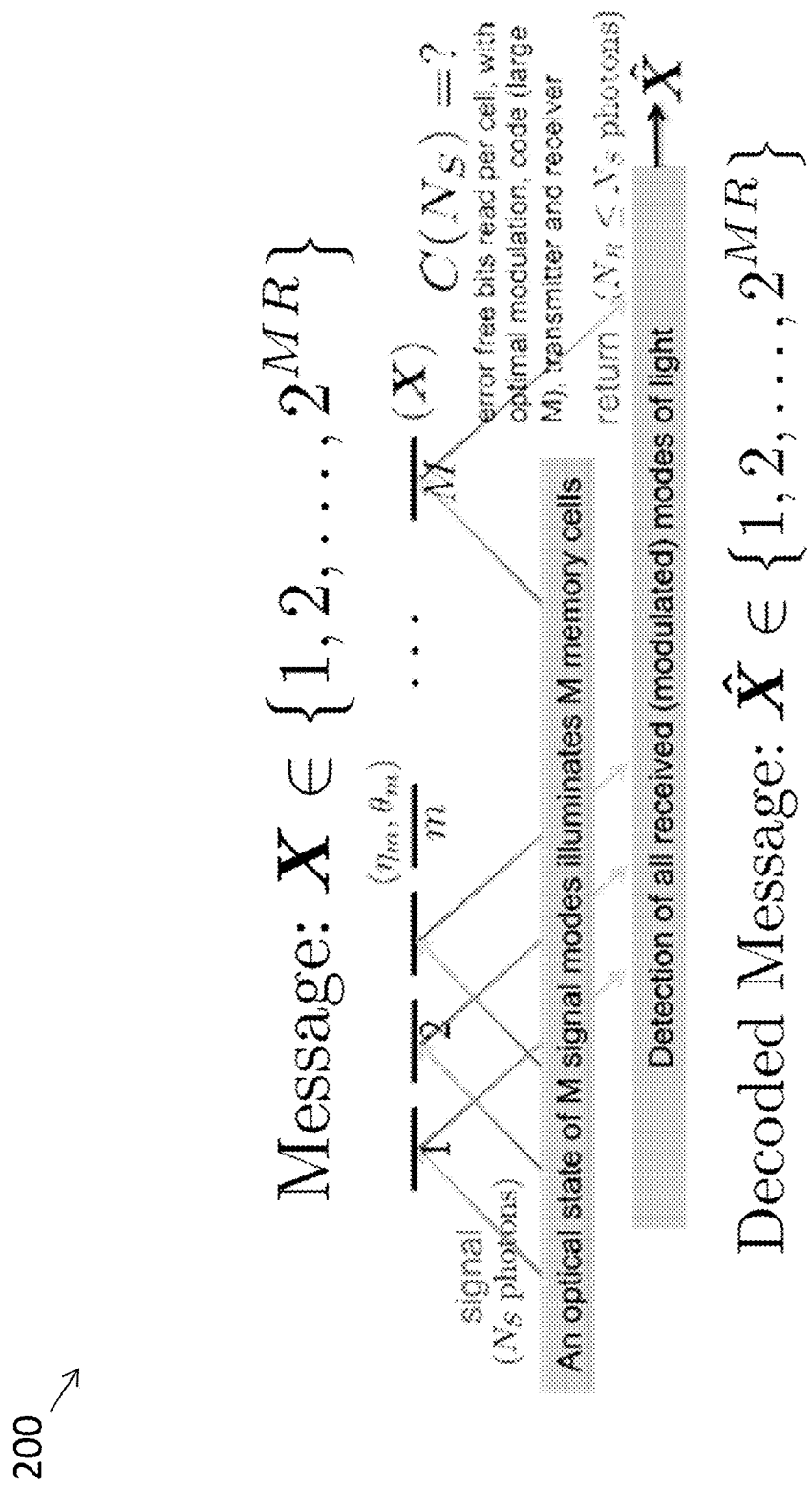
FIG. 2 illustrates a schematic diagram of a generalized optical memory system that implements passive linear optic reflective encoding.

FIG. 2 illustrates a schematic diagram of a generalized optical memory system 200 that implements passive linear optic reflective encoding. FIG. 2 demonstrates the number of bits that can be read per cell, considering optimal modulation, code (i.e., large M), transmitter and receiver. FIG. 2 illustrates M memory cells (i.e., pixels), where each of the memory cells can modulate the spatial mode of the incident probe light, with power attenuation given by: $\eta_m \epsilon [0,1]$ and/or a carrier phase shift given by: $\theta_m \epsilon [0, 2\pi]$. A transmitter sends $N_s$ photons on an average in K (spatial-temporal) modes, toward each memory cell. The system 200 is implemented to read a number of bits of information per memory cell, $C(N_s)$, wherein $C(N_s)$ has no upper limit. The photon information efficiency (PIE) is defined as $C(N_s)/N_s$, the number of bits read per photon. As is true for most "capacities", reading data at a rate, R, below $C(N_s)$ bits/pixel at a probability of word error $P_e \to 0$, may require coding over $M \to \infty$ many pixels and also a joint detection receiver (JDR) over those infinitely many pixels. For example, in FIG. 2 a message given by $X \epsilon \{1, 2, \ldots, 2^{MR}\}$ is encoded in the system 200, and decoded as an estimate of the encoded message given by: $\hat{X} \in \{1, 2, \ldots, 2^{MR}\}$. In the example, the message is an M-symbol code word: $2^{MR}$ M-length binary sequences of $\{0\}$'s and $\{\pi\}$'s. In exemplary embodiments, as described further herein, the system 200 discriminates $2^{MR}$ codewords (each codeword corresponding to a message) at a word error rate, $P_e$. The system 200 reads MR bits of information over M cells, which means reading R bits of information per cell. The maximum possible R at which $P_e \to 0$ is possible as $M \to \infty$, is the capacity C. Capacity $C(N_S)$ increases as the mean photon number sent towards a cell $N_S$ increases.

In addition, the system 200 implements a minimum number of pixels M required (length of code and JDR) to attain a certain PIE, such that $P_e \leq \epsilon$. In addition, as further described herein, the system 200 can implement (e.g., the system 100 of FIG. 1) non-classical states of light and/or non-standard optical receivers (including JDRs) that can outperform a coherent state (laser) probe and the standard optical receivers (e.g., homodyne, heterodyne and direct-detection). Loss in transmission of the probe light and collection of the reflected light, excess noise (such as noise stemming from detector imperfections or a thermal background) can occur in the system 200. In addition, neighboring pixels may not be spatially resolved. However, it will be appreciated that the system 200 still maintains no upper limit on the number of bits of information per photon, which is equal to the number of bits of information read per memory cell, $C(N_s)$, divided by the mean photon number of the probe sent to interrogate each memory cell, $N_s$. The system 200 focuses on the high photon efficiency (low photon flux) regime of optical reading.

Figures 3A, 3B:
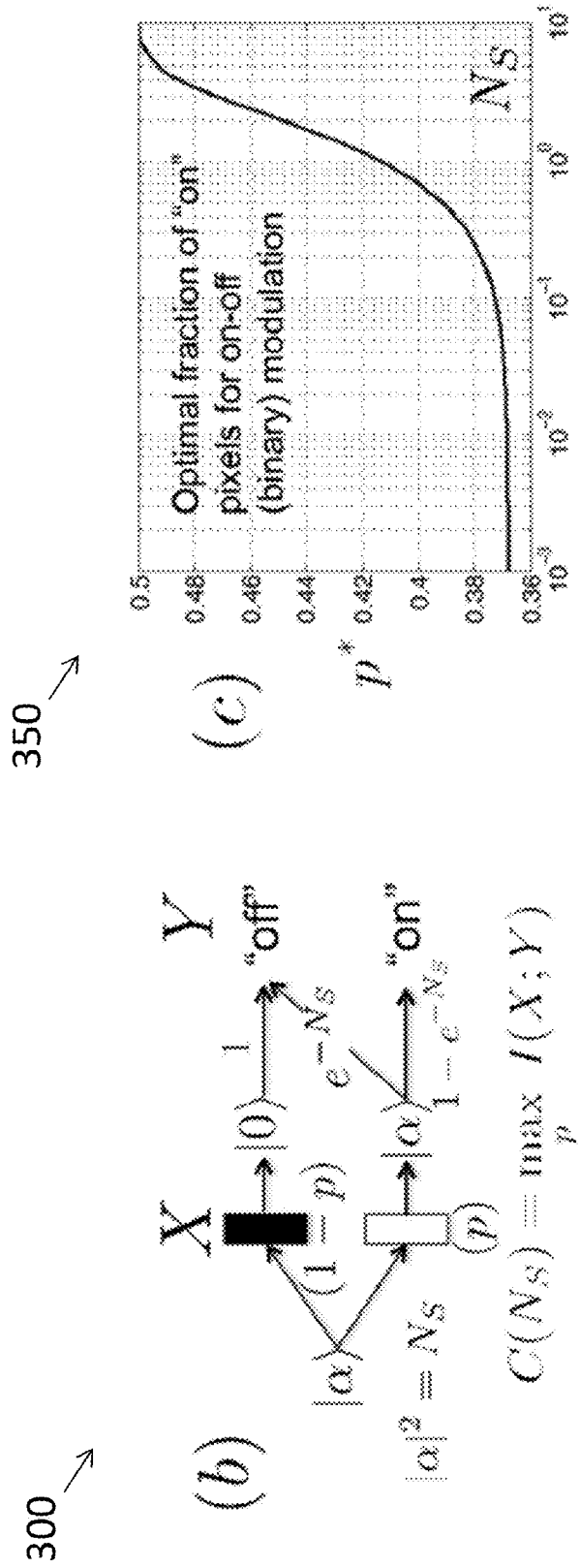
FIG. 3A illustrates an example of a binary asymmetric channel.
FIG. 3B illustrates a plot of the optimal fraction of "on" pixels in an on-off amplitude encoded memory detected via direct detection, versus mean photon number sent to interrogate each memory pixel, $N_s$.

In a standard CD/DVD disc drive, certain conditions can be considered ideal in considering capacity of reading (i.e., a noiseless laser light probe, on-off amplitude modulation, and a signal-shot-noise limited ideal direct detection receiver). A coherent state of K modes can be treated as a single-mode coherent state. As such, interrogation and detection of each pixel induces a binary asymmetric channel 300 shown in FIG. 3A. The Shannon capacity of a classical noisy communication channel is the maximum amount of information that can be transmitted reliably over the channel, per channel use. The Shannon capacity of the channel of FIG. 3A is given by:

$$C(Ns) = \max_{p \in (0,1)} I(X; Y) \quad (1)$$

$$= \max_{p \in (0,1)} [H(Y) - H(Y|X)] \quad (2)$$

$$= \max_{p \in (0,1)} [H(p(1 - e^{-N_S})) - pH(e^{-N_S})] \quad (3)$$

where $H(x) = -x \log_2 x - (1-x)\log_2(1-x)$ is the binary entropy function. A simple differentiation of the last expression above yields an optimal value of p, the fraction of "on" pixels in the code that would maximize $C(N_S)$, given by:

$$p*(N_S) = \frac{1}{(1-e^{-N_S})\left[1 + 2^{He^{-N_S}/(1-e^{N_S})}\right]} \quad (4)$$

Figure 4:
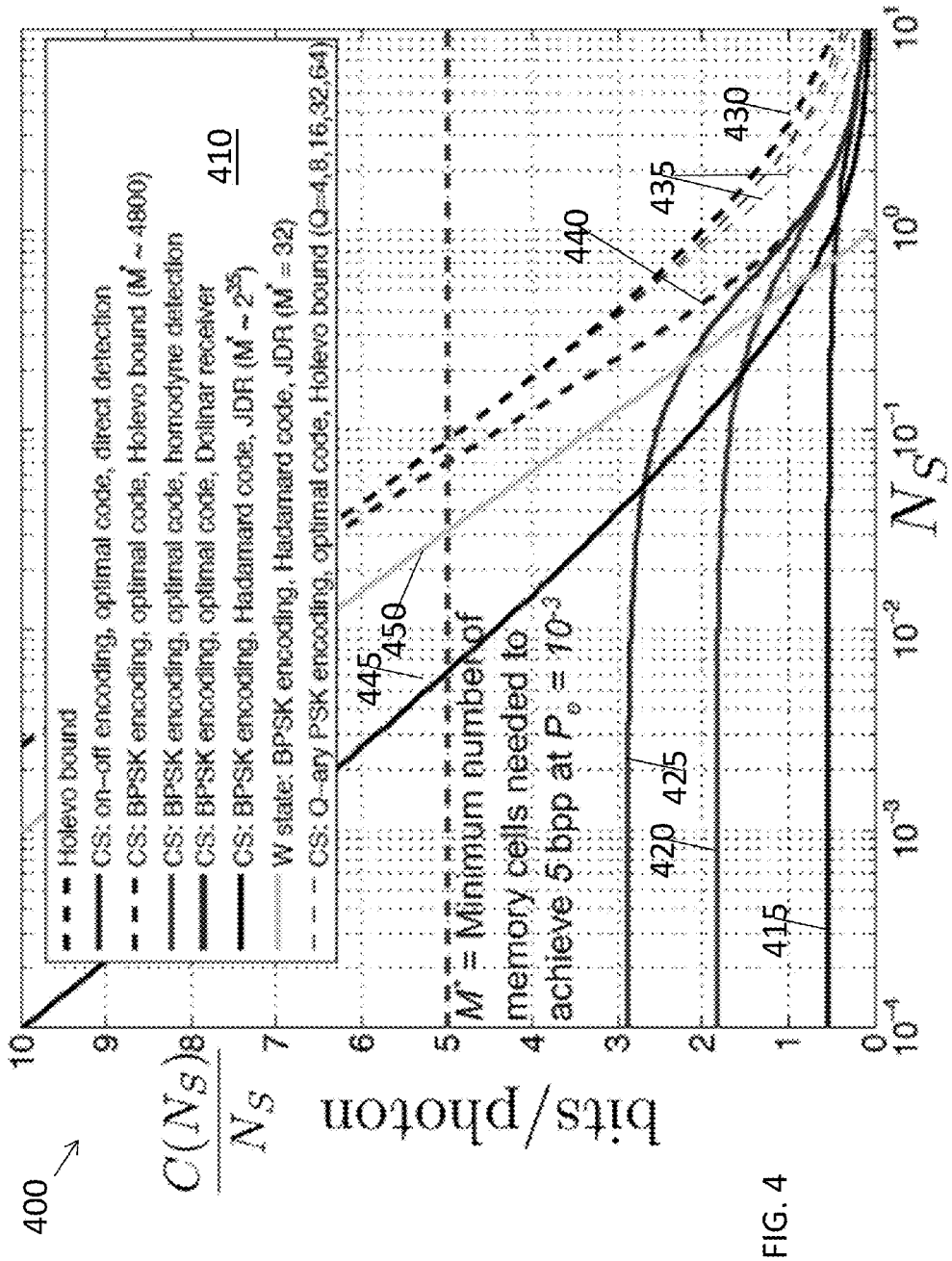
FIG. 4 illustrates a plot of Photon Information Efficiency (PIE) versus a mean photon number sent to interrogate each memory pixel, $N_s$.

FIG. 3B illustrates a plot 350 of p* versus $N_S$ and demonstrates that $p*(N_S)$ saturates at 0.5 for $N_S \gg 1$, and saturates to $\approx 0.368$ for $N_S \ll 1$. The Holevo bound defines the upper limit to the Shannon capacity of the channel for input quantum states, and when any arbitrarily complex measurement may be used by the receiver. FIG. 4 illustrates a plot 400 of PIE versus a mean photon number to interrogate each memory cell for several scenarios shown in a legend 410. The curve 415 line in plots the PIE $C(N_S)/N_S$ as a function of $N_S$ for on-off pixel modulation, coherent-state probe, and direct detection. The PIE caps off at $\approx 0.53$ bits per photon (bpp) at $N_S \ll 1$. This result implies that even with the optimal code (i.e., code words that are infinitely many pixels long), using an on-off modulation, an ideal laser transmitter, and a signal-shot-noise limited direct detection receiver, no more than about 0.5 bits can be read per transmitted photon.

Figure 5:
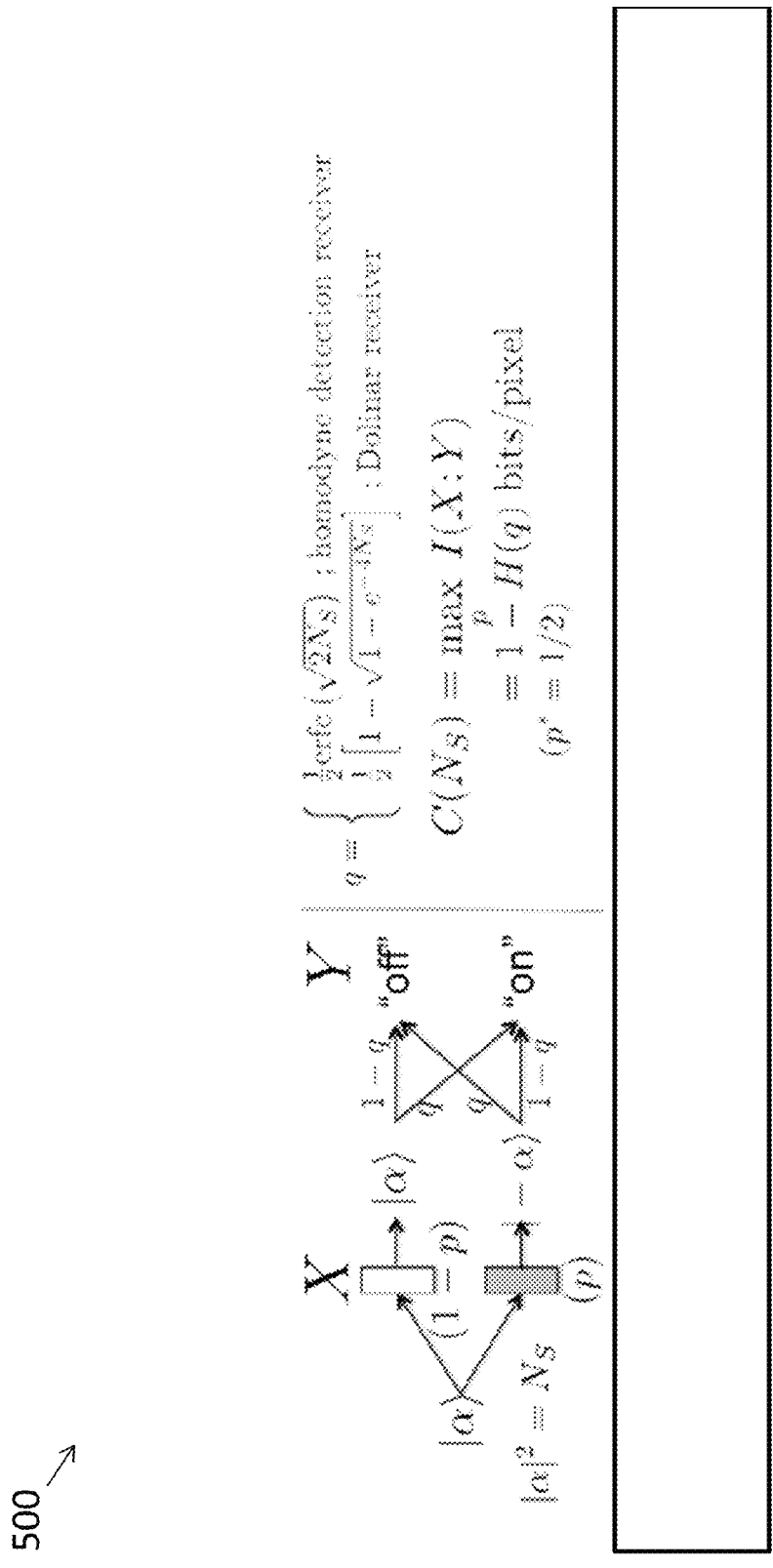
FIG. 5 illustrates an example of a binary symmetric channel.

The above example considers on-off amplitude modulation. In other examples, binary phase-shift keyed (BPSK) modulation is implemented. Each memory cell as described in FIG. 2 can be considered a perfectly reflective pixel, but some are etched $\lambda/2$ deeper into the surface of the disc, where $\lambda$ is the wavelength of the (quasi-monochromatic) probe light. A coherent state probe $|\alpha\rangle$, $|\alpha|^2 = N_S$ is reflected as $|\alpha\rangle$ or $|-\alpha\rangle$ depending upon whether the phase of the pixel is $\theta = 0$ or $\theta = \pi$. The conventional receiver that discriminates the states $\{|\alpha\rangle, |-\alpha\rangle\}$ is a homodyne detection receiver. The homodyne detection receiver results in Gaussian distributed outcomes $\beta \sim N(\pm\alpha, \frac{1}{4})$, which if discriminated by a threshold detector (i.e., $\beta < 0 \Rightarrow \theta = 0$ and $\beta \geq 0 \Rightarrow \theta = \pi$), induces a binary symmetric channel with crossover probability $q_{hom} = \text{erfc}(\sqrt{2N_S})/2$ (see FIG. 5). In FIG. 5, a binary symmetric channel is induced when a coherent state probe $|\alpha\rangle$ interrogates each memory cell, and the reflected light is detected by either using a conventional Homodyne receiver with a threshold detector, or by using the Dolinar receiver, which receiver that can attain the minimum probability of error of discriminating between two coherent states.

The capacity of the binary symmetric channel with a crossover probability $q_{hom}$ is given by $C(N_S) = 1 - H(q_{hom})$, and is achieved for a uniform prior for the two phases. The minimum average probability of error achievable for discriminating a single copy of the two equally-likely states $\{|\alpha\rangle, |-\alpha\rangle\}$ is given by the Helstrom limit $P_{e,min} = [1-\sqrt{1-e^{-4N_S}}]/2$. This minimum probability of error can in principle be achieved exactly implementing a Dolinar receiver, which is a structured optical receiver design that uses a local time-varying optical feedback and high-speed single photon detection. The plots 420, 425 in FIG. 4 plot the PIE for a BPSK encoding and the homodyne and Dolinar receivers, respectively, which cap off at 1.84 bpp and 2.89 bpp, respectively.

The Holevo capacity of a pure-loss optical channel with a mean received photon number per mode $N_S$ is given by $g(N_S)$ bits/mode, where $g(x) = (1+x)\log_2(1+x) - x\log_2(x)$. This capacity is achievable using a coherent state code with symbols $|\alpha\rangle$ chosen randomly from a Gaussian prior density $p(\alpha) = e^{-|\alpha|^2/N_S}/\pi N_S$. Therefore, for communicating classical data on a pure-loss optical channel, non-classical transmitter states cannot achieve any higher capacity than coherent states. From the converse of the capacity theorem, $g(N_S)$, treating the reflected light from the memory cells as a modulated codeword, and monotonicity of the $g(\cdot)$ function, the optical reading capacity $C(N_S) \leq g(N_S)$. However, the optical reading transmitter has less encoding freedom than the communication transmitter, since the modulation happens passively at the pixels. As such, $C(N_S) = g(N_S)$ bits/pixel is not achievable using a coherent state code, but is achievable by a non-classical transmitter and a quantum joint detection receiver.

The plot 430 in FIG. 4 plots the PIE of the Holevo bound $g(N_S)/N_S$. As such, it is appreciated, that there is no upper bound to PIE that can be achieved. However, the higher the PIE, the lower the mean photon number $N_S$ used to interrogate each pixel. Even though coherent states cannot attain the Holevo bound, in the high-PIE ($N_S \ll 1$) regime, the coherent state capacity $C(N_S)$ comes very close to the Holevo bound with phase-only modulation. The plots 435 in FIG. 4 are the PIE of the Holevo limits of a Q-ary phase-shift-keying (PSK) constellation used to encode the data (with Q=2, 4, 8, 16, 32). The Q-ary PSK constellation is a modulation scheme that encodes the data by modulating the phase of the probe light by Q=2, 4, 8, 16, 32 equally-distributed phase values. Since the Holevo limit of the Q-ary PSK constellation is an achievable rate, which can be achieved via Q-ary phase modulation at the pixels and a suitable joint detection receiver, it is a lower bound to the imaging capacity, i.e., C ($N_S$)≥CPSK-Holevo ($N_S$), where:

$$C_{PSK-Holevo}(N_S) = \max_{Q \geq 2} -\sum_{q=1}^{Q} N_s \log_2 y_q(N_S)$$

where $\{y_q(N_S)\}$, $1 \leq q \leq Q$ forms a probability density given by, $$y_q = \frac{1}{Q} \sum_{k=1}^{Q} e^{-N_S\left(1-\cos\left[\frac{2\pi k}{Q}\right]\right)} \cos\left[N_S \sin\left[\frac{2\pi k}{Q}\right] - \frac{2\pi k q}{Q}\right].$$

For the special case of Q=2, the Holevo capacity is given by:

$$C_{BPSK}(N_S) = H((1+e^{-2N_S})/2)$$

whose PIE is shown by the plot 440 in FIG. 4, which approaches the Holevo limit at low $N_s$. The gap between the BPSK-Dolinar PIE (plot 425) and the BPSK-modulation Holevo limit (plot 440) is bridged using JDRs.

Figure 6:
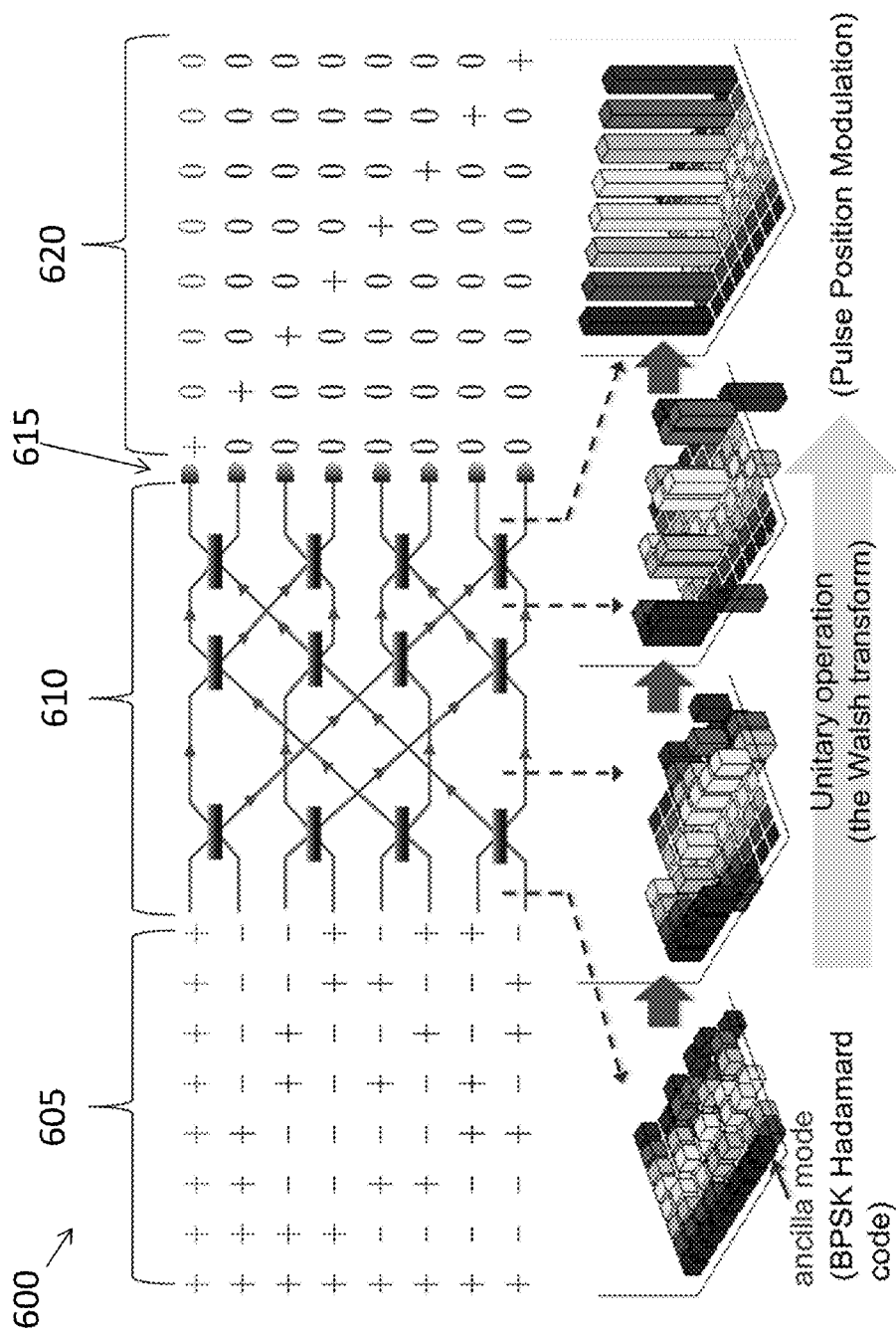
FIG. 6 illustrates an example of a code-joint-detection receiver (JDR) pair for Binary Phase Shift Keyed (BPSK) modulation scheme in the context of optical reading.
Figure 7:
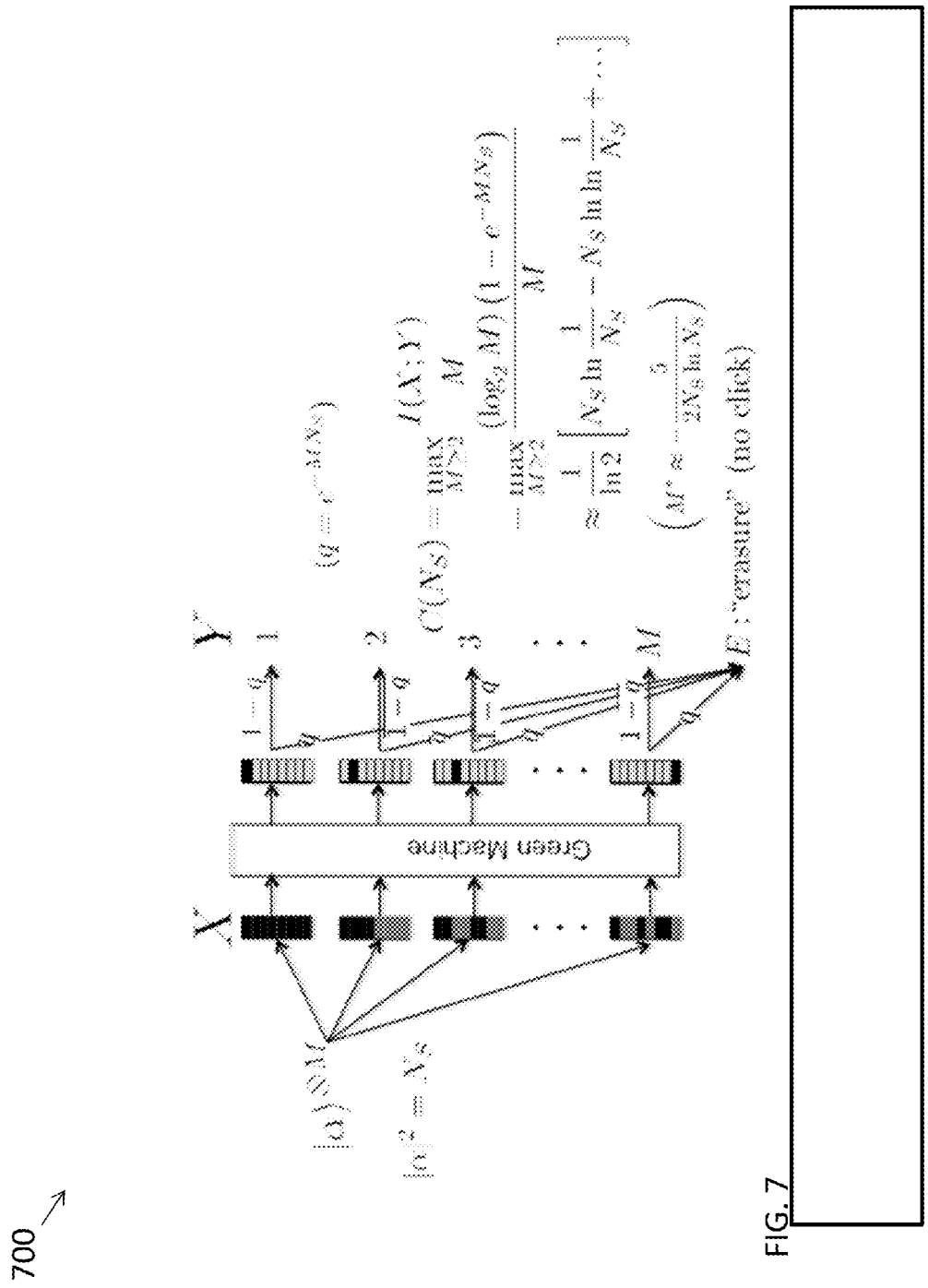
FIG. 7 illustrates an example of an M-input, M+1 output super channel induced by a coherent state probe, binary phase Hadamard coded memory and a JDR.

FIG. 6 illustrates an example of a code-JDR pair for BPSK modulation scheme in the context of optical reading. The code-JDR pair implements a ($2^m$, $2^m$, $2^{m-1}$) binary Hadamard code to encode the binary phases on M=$2^m$ pixels. The receiver includes a giant interferometer implementing M log$_2$ M/2 50-50 beamsplitters arranged in the "Green Machine" format, which interferometrically mixes the modulated light from the M pixels, transforming the BPSK Hadamard coded pulses, through log$_2$ M stages of the Green Machine, into a spatial pulse-position-modulation (PPM) code. A coherent-state pulse with mean photon number M $N_S$ appears at one of the M outputs of the Green Machine, depending upon which of the M phase codewords the probe light interrogates. The output is detected by an array of M signal-shot-noise-limited single photon detectors. FIG. 7 illustrates an example of an M-input, M+1 output super channel 700 induced by a coherent state probe, binary phase Hadamard coded memory and a JDR. This probe-code-JDR combination induces an M-input, M+1-output discrete memoryless superchannel shown in FIG. 7, whose capacity (in bits/pixel) is given by:

$$C_{BPSK-Hadamard-JDR}(N_S) = \max_{M \geq 2} \frac{I(X;Y)}{M} \quad (5)$$

$$= \max_{M \geq 2} \frac{(\log_2 M)(1 - e^{-MN_S})}{M} \quad (6)$$

$$= \frac{1}{\ln 2}\left[N_S \ln\frac{1}{N_S} - N_S \ln\ln\frac{1}{N_S} + \ldots\right] \quad (7)$$

bits/pixel when $N_S \ll 1$. Here the optimal value of M as a function of $N_S$ is given by $M^* \approx -5/2N_S \ln N_S$, for NS≪1. This photon efficiency is plotted by the plot 445 in FIG. 4. Unlike all the structured probe-receiver cases considered above where the optical receiver directly measures the reflected light from each pixel individually, the PIE now increases without bound as $N_S \geq 0$. In addition, the first two leading terms of the Holevo bound (both the unrestricted-modulation Holevo bound and the coherent-state-probe BPSK-encoding Holevo capacity) are given by:

$$C(N_S) = \frac{1}{\ln 2}\left[N_S \ln\frac{1}{N_S} + N_S + \ldots\right] \text{bits/pixel} \quad (8)$$

for $N_S \ll 1$. The photon efficiency can be increased slightly by using the ($2^m$, $2^m$, $2^{m-1}$) binary Hadamard code (thereby using M=$2^m-1$ pixels), and retaining a local oscillator reference at the transmitter, to use as an ancilla input (i.e., a locally encoded signal that facilitates identification of errors in a received code word) into the Green Machine (see FIG. 6). FIG. 6 illustrates an example of a receiver configuration 600 used to decode information. The receiver configuration 600 can include a transformation operator 610 that performs transformations on a Hadamard matrix input 605. As described above, the Hadamard matrix input 605 may correspond to an ancilla mode. The receiver configuration 600 can also include a detector array 615, such as single photon detectors described with respect to FIG. 1. As such, for a given Hadamard matrix input 605, the transformation operator 610 in combination with the detector array 615, can output a pulse position modulation matrix 620.

The achievable capacity in Eq. (8), and all the coherent-state structured-receiver capacities above, are Shannon capacities of the respective induced discrete memory channels. Hence, in order to achieve error-free reading at a rate close to the respective capacities (in bits/pixel), a suitable Shannon-capacity-achieving outer code is implemented for the respective induced channel. For example, for the Green Machine JDR, a systematic way of building codes that could detect and correct multiple random symbol errors, such as a Reed Solomon outer code can be implemented.

Figure 8:
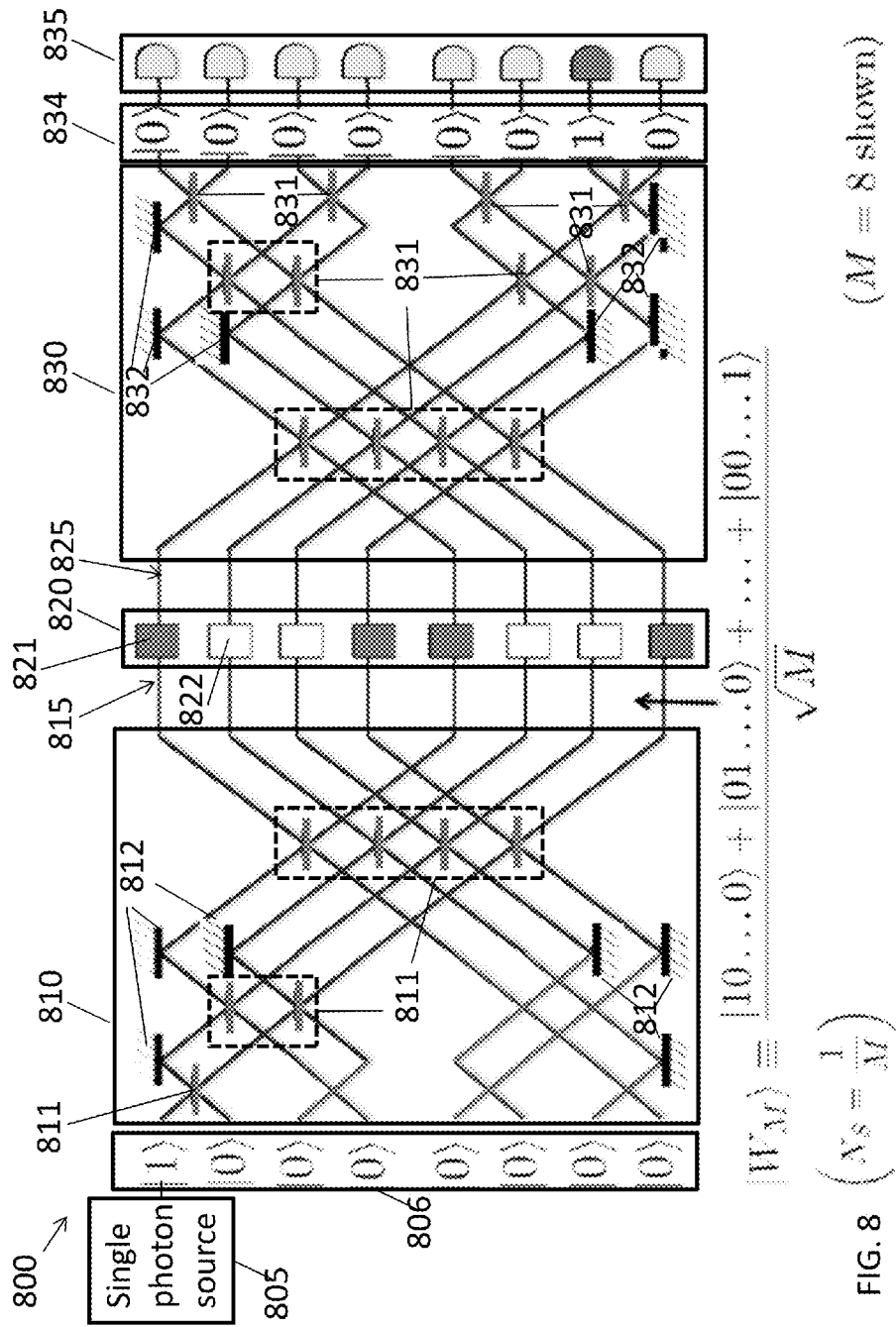
FIG. 8 illustrates an exemplary optical imaging system.

In another example, the same modulation and code as the previous example (binary-phase-coded pixels, and the Hadamard code) is retained, but a spatially-entangled non-classical optical probe state, the W-state, is implemented. FIG. 8 illustrates an exemplary optical imaging system 800. As described in FIG. 1, the transmitter 110 and receiver 130 are both configured to support a single photon in an entangled quantum state. FIG. 8 illustrates a W-state configuration as now described. The system 800 includes a single photon source 805 configured to generate single photons within the system 800. Similar to FIG. 1, the single photon source 805 can be any suitable device such as but not limited to a heralded spontaneous parametric down-conversion (SPCD) source, a nitrogen-vacancy center (N-V center) diamond, and a quantum dot. It will be appreciated that the single photon source 805 can be any suitable device for generating single photons. As described herein, the single photon source generates a single photon 806 in a Fock state |1⟩. The system 800 further includes a transmitter 810 configured to receive the single photons 806 and configure the single photons 806 into an entangled quantum state. As described herein, the transmitter 810 is capable of receiving the single photon 806 from the single photon source 805 and place the single photon 806 in a coherent superposition of multiple phase and spatial locations. FIG. 8 illustrates the transmitter 810 as a W-State transmitter. The transmitter 810 includes an array of 50-50 beam splitters 811 that generate, in the example, an M=8 mode W state. An array of mirrors 812 contains the wavefunction of the single photon 806 within the transmitter 810. As the single photon 806 passes through each of the beam splitters 811, the single photon wavefunction 806 spreads over an additional spatial location. As described herein, the example in FIG. 8 generates an M=8 mode W state, although fewer or more modes are contemplated in other examples.

The system 800 further includes an optically encoded medium 820 onto which the single photon light signal 815 interacts and is reflected into a modulated single photon light signal 825. The optically encoded medium can be any optically encoded medium such as but not limited to compact disks (CD), digital video disks (DVDs), bar codes and any optically encoded memory. In addition, the coding of the optically encoded medium 120 can be any suitable encoding such as but not limited to binary phase encoding. The example shown in FIG. 8 is a Hadamard-coded binary-phase memory. In the example of FIG. 8, the optically encoded medium 820 includes several pixel types. The example shows shaded pixels 821 and unshaded pixels 822. The shaded and unshaded pixels 821, 822 are illustrated to demonstrate that the encoding includes different coding states. For example, for the Hadamard-coded binary-phase memory, the shaded and unshaded pixels 821, 822 can correspond to phase states '0' and 'π'.

The system 800 further includes a receiver 830 configured to receive the modulated single photon light signal 825, which is still in a quantum entangled state, but phase modulated by the Hadamard-coded pixels. The receiver 830 includes a similar infrastructure as the transmitter, that is, an array of 50-50 beam splitters 831 and an array of mirrors 832. The wave function of the single photon light signal 825 evolves through the beam splitters 831 of the receiver 830, eventually coalescing into the single photon Fock state $|1\rangle$ 834 at one of M outputs of a single photon detector array 835 depending upon which one of the M code words of the Hadamard code the transmitter state interrogated. The single photon detector array 835 can be any suitable single photon detector such as but not limited to a high detection detector (i.e., a transition edge sensor (TES) detector), a high speed, lower detection detector (i.e., a superconducting single photon detector (SSPD)), and a low detection efficiency, high speed detector (i.e., a silicon avalanche photo diode (APD)). The system 100 can be modified in various manners as described herein and can implement various optical imaging methods as further described herein.

As such, the system 800 sends one photon in a coherent superposition of interrogating M memory cells, i.e., $$|W_M\rangle \equiv \frac{|10\ldots 0\rangle + |01\ldots 0\rangle + \ldots + |00\ldots 1\rangle}{\sqrt{M}} \quad (9)$$

which can be prepared using the single-photon source 805 (generating a one-photon Fock state $|1\rangle$). The W-state transmitter (i.e., the transmitter 810) attains the performance metrics 5 bpp at $P_e^{(M)} \leq 10^{-3}$, with the Hadamard-coded binary-phase memory, with only M=32 memory cells and $$C(N_S) = N_S \log_2 \frac{1}{N_S} \text{bits/pixel},$$

with Pe exactly zero. In exemplary embodiments, the transmitter 810 includes M−1 beam splitters 811 to achieve the above-referenced results. In addition, the receiver 830 also includes M log₂M/2 beam splitters 831 followed by an array of M single photon detectors 835.

The effect of the reflection from the Hadamard-phase-coded pixels is that the '+' signs in the superposition above corresponding to the pixels with θ=π become '−' signs as follows:

$$|W_M\rangle \equiv \frac{|10\ldots 0\rangle - |01\ldots 0\rangle - \ldots - |00\ldots 1\rangle}{\sqrt{M}}$$

It can be stated that the memory-modulated state for code word m is $|W_M^{(m)}\rangle$, for 1≤m≤M. Since any pair of code words from the Hadamard code differ in exactly half (M/2) the positions, the states $|W_M^{(m)}\rangle$, are mutually orthogonal quantum states; i.e., $\langle W_M^{m_1}|W_M^{m_2}\rangle = \delta_{m_1,m_2}$. Therefore, these M modulated states can be discriminated with zero probability of error. For example, the receiver 830 of FIG. 8 can discriminate the M modulated states with zero probability. The wave function of the single photon evolves through the log₂M receiver stages, eventually coalescing into the single photon $|1\rangle$ at one of the M outputs to the array of single photon detectors 835 of the receiver 830 depending upon which one of the M code words of the Hadamard code the transmitter state 815 interrogated. A single-photon Fock state $|1\rangle$ generates a click with probability '1' when detected by a single photon detector 835 (unlike a coherent state $|\beta\rangle$, which generates no clicks with probability $e^{-|\beta|^2}$, as illustrated in the coherent-state JDR example above in FIG. 7). Therefore, this transceiver reads log₂M bits of information error-free (without any further outer coding) using just one transmitted photon, with no upper limit on M. $N_S$ is defined as the mean photon number transmitted by the probe towards each pixel, $N_S$=1/M. As such, capacity is given by:

$$C_{W-state}(N_S) = N_S \log_2 \frac{1}{N_S} \text{bits/pixel} \quad (10)$$

Figure 9:
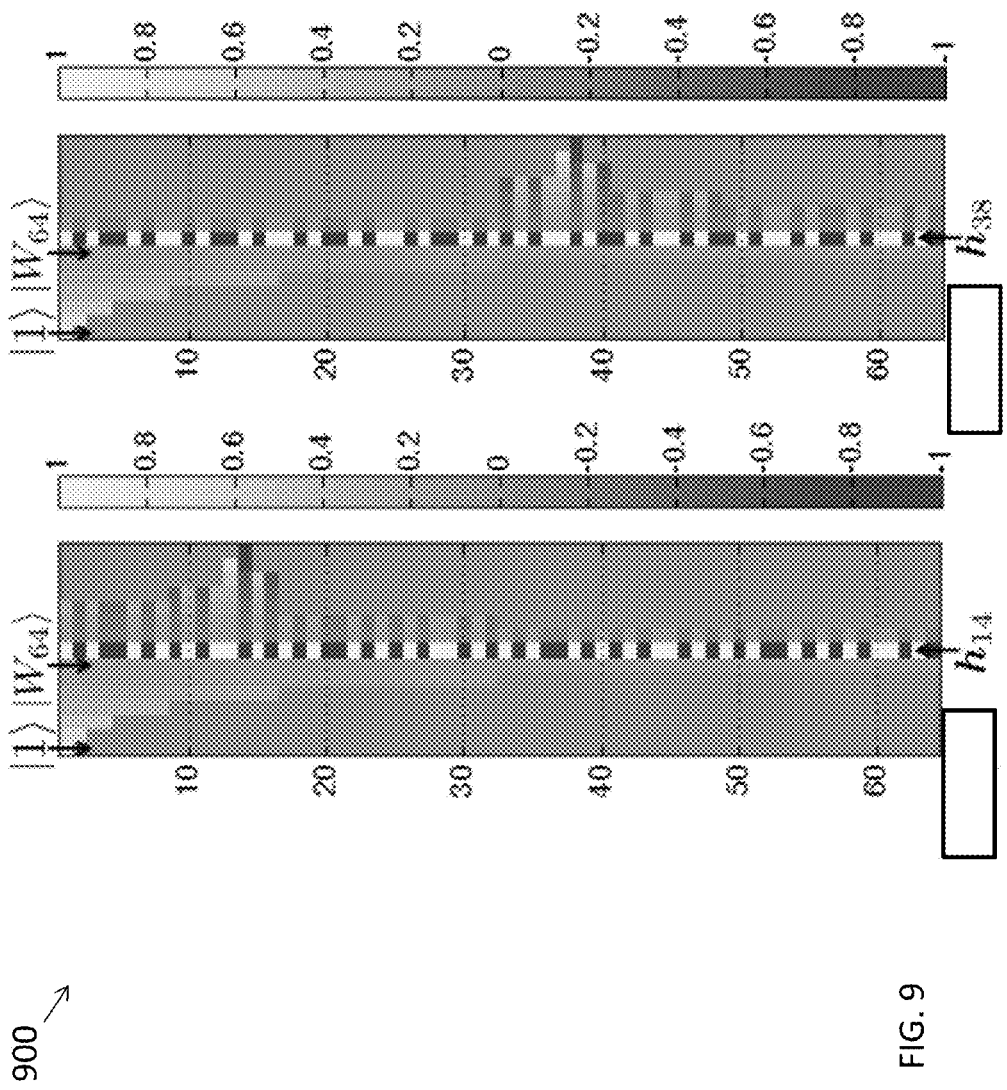
FIG. 9 illustrates two examples of the evolution of the probability amplitude of a single photon.

In equation (10), the capacity has the same leading-order term as the Holevo limit and the Coherent-state JDR example of FIG. 7. But, the PIE is now log₂ (1/$N_S$), which is why it is a straight line when plotted versus $N_S$ on the log scale (see plot 450 in FIG. 4). FIG. 9 shows two examples of the evolution of the probability amplitude 900 of the single photon during the encoding and decoding phases of the reading using a W-state, using a M=64 mode W-state transmitter, where $h_m$ denotes the $m^{th}$ Hadamard code word, 1≤m≤64.

In considering the error exponent of quantum reading, all the capacity expressions for the coherent-state-probe calculated herein (i.e., the Holevo limits as well as the structured-receiver capacities) are (Holevo or Shannon) capacity results. This observation implies that achieving reliable reading (i.e., reading information such that the probability of code word error $P_e^{(M)} \le \epsilon$ for some low-enough threshold $\epsilon$) at a rate R<C ($N_S$) bits/pixel would require an optimal code (for all the Shannon-capacity results of the structured receivers), and would require an optimal code as well as an optimal JDR (for all the Holevo-capacity results).

It can be appreciated that the capacity is an information-theoretic perspective that determines the fundamental limit on achievable rates at which data can be read, since the capacity alone gives only the knowledge of the maximum achievable rate (with no information on the coding and receiver complexity required). However, a stronger form of the channel coding theorem can be implemented to determine the behavior of the error probability $P_e^{(M)}$ as a function of the code word length (number of pixels) M and the actual rate R (bits/pixel), both for Shannon capacity, as well for Holevo capacity. The reliability function or the error exponent for optical reading is defined as:

$$E(R) \equiv \lim_{M \to \infty} \sup \frac{-\ln P_e^{opt}(R \cdot M)}{M}, \; \forall \; R < C(N_S) \tag{11}$$

where $P_e^{opt}(R \cdot M)$ is the average block error probability for the optimal block code of length M and rate R. The error exponent describes how quickly the error probability decays as a function of the code word length, and hence serves to indicate how difficult it may be to achieve a certain level of reliability in reading at a rate below the capacity. An exact error exponent can be difficult to identify, however, the classical (Gallager's) lower bound is available. This lower bound is known as the random coding error exponent, and has been used to estimate the code word length required to achieve a prescribed error probability for various communication settings. Similar to Gallager's lower bound, others found the random coding error exponent for the Holevo capacity (for transmitting classical data on a quantum channel) for the pure-state channel, and later generalized it to the general case of a mixed-state alphabet. For the Shannon capacity case, there exists an upper bound (i.e., the sphere-packing bound), which coincides with E(R) for high rates, and thus gives the exact expression for E(R). In the quantum case, no useful upper bound for E(R) has been known, although Dalai's upper bound has been determined to be the sphere-packing bound for the error exponent to the Holevo capacity. Dalai's upper bound to E(R) for the quantum channel coincides with the random coding lower bound, thereby yielding the true value of E(R) at high rates. As described herein, it can still be difficult to come up with an exact error exponent of the quantum channel.

Figure 10:
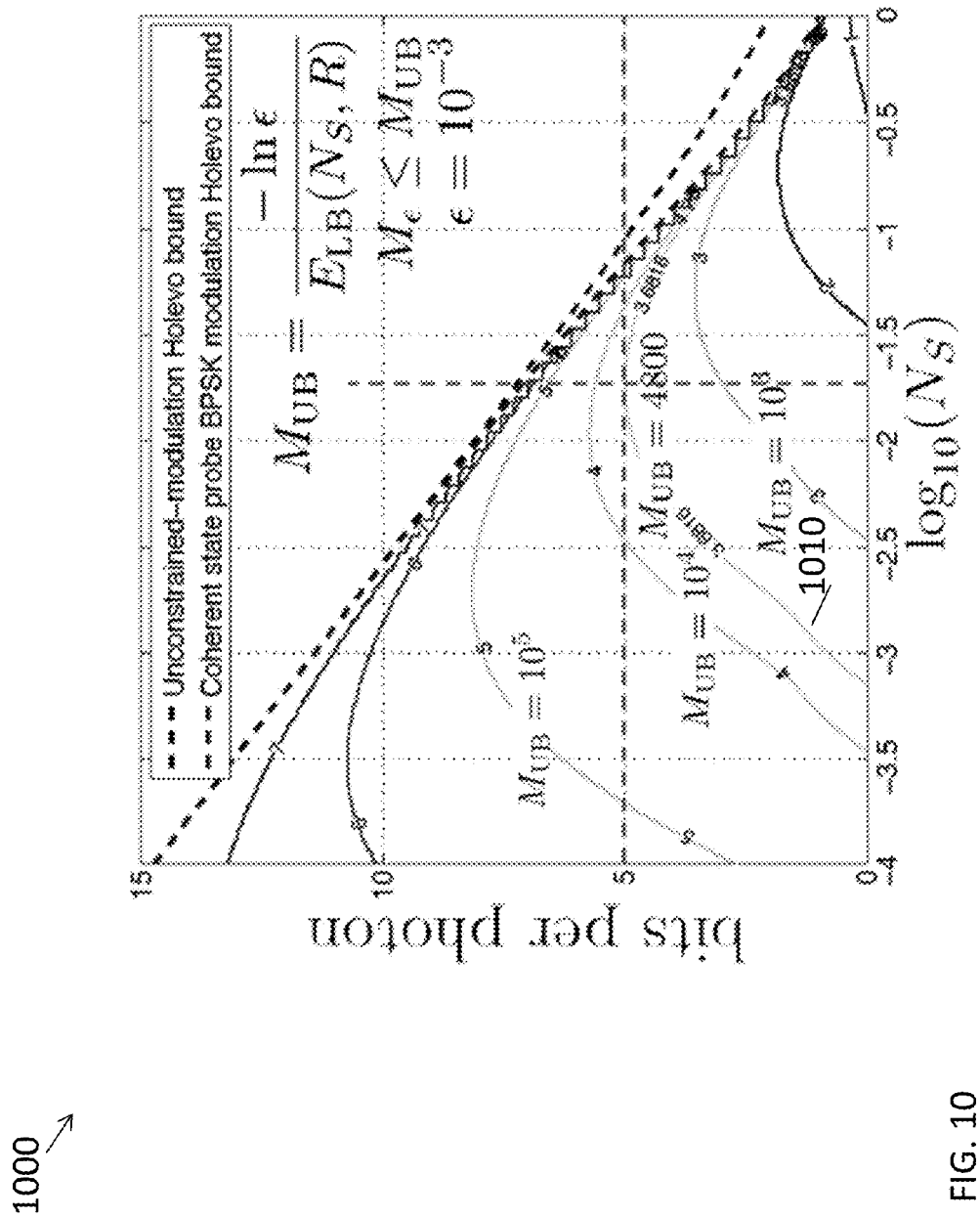
FIG. 10 illustrates a plot of PIE versus a mean photon number sent to interrogate each memory pixel, $N_s$.

In order to compare the error-exponent performance of various transceivers described herein, a PIE goal of 5 bpp is set, and probability of word error threshold is set to $\epsilon=10^{-3}$ in order to set optimal code and optimal JDR for the coherent state probe. In order to estimate the number of pixels M required to meet 5 bpp and $P_e^M=10^{-3}$ using a coherent state transmitter, and the optimum code-JDR pair, the Burnashev-Holevo lower bound $E_{LB}(N_S, R) \ge E(N_S, R)$ is evaluated for two pure non-orthogonal pure states $\{|\alpha\rangle, |-\alpha\rangle\}$, $|\alpha|^2=N_S$, $\langle -\alpha|\alpha\rangle = e^{-2N_S}$. FIG. 10 shows a plot of PIE versus $N_S$ for a coherent-state probe interrogating a binary-phase coded memory and detected by an optimal JDR, contours of constant values of the upper bound to the number of pixels derived from the Burnashev-Holevo random-coding lower bound to the error exponent of a pure-state quantum channel.

$M_{UB} = -\ln \epsilon/E_{LB}(N_S;R)$, are plotted in the PIE (R/$N_S$) vs. $N_S$ plane. The contours of constant $M_{UB} = -\ln \epsilon/E_{LB}(N_S, R)$, are plotted in the PIE (R/$N_S$) vs. $N_S$ plane in FIG. 10, for $\epsilon=10^{-3}$. At R/$N_S$=5 bpp, $M_{UB}$=4800, as shown in plot 1010. Therefore, in order to attain 5 bpp at $P_e^{(M)} \le 10^{-3}$, the minimum number M of pixels required satisfies M≤4800. Given that the rate is about ⅔rd of capacity at this point, the random coding bound is a good estimate of the actual number of pixels required.

In exemplary embodiments, the exemplary systems 100, 800 of FIGS. 1 and 8 are now evaluated. The probability of word error for this probe-code-JDR combination is given by the probability of erasure times, that is, the probability of an (incorrect) random mapping, i.e., $P_e^{(M)}=(m-1)e^{-MN_S}/M$. PIE is given by $$\frac{C(N_S)}{N_S} = \frac{(\log_2 M)(1-e^{-MN_S})}{MN_S} bpp.$$

As such, to achieve 5 bpp at $P_e^{(M)} \le 10^{-3}$, as described herein, $M \approx 2^{35}$ pixels are needed.

In exemplary embodiments, the system 800 of FIG. 8 for example, can read $\log_2$ M bits using one transmitted photon at $P_e^{(M)}=0$. Therefore, to achieve 5 bpp at $P_e^{(M)} \le 10^{-3}$, an M=32 pixel memory is implemented.

Figure 11:
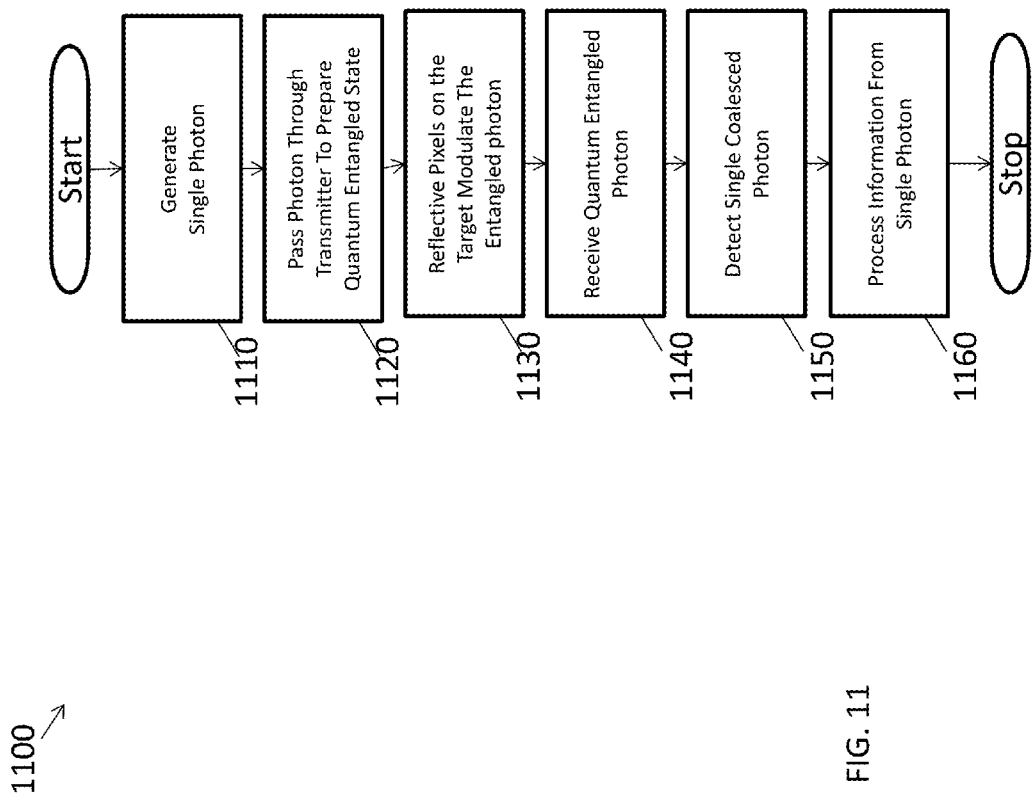
FIG. 11 illustrates an overall optical reading method in accordance with exemplary embodiments.

FIG. 11 illustrates an overall optical reading method 1100 in accordance with exemplary embodiments. At block 1110, either of the systems 100, 800 generate a single photon in a Fock state. At block 1120, the photon passes through the transmitters 110, 810 and enters into a quantum entangled state as described herein. The single photon is spatially entangled and can be implemented to read a much higher number of bits of information per photon as compared to light generated by conventional optical transmitters. As such, at block 1130, the photon is reflected (and modulated) from the optically encoded medium 120, 820 and received into the receiver 130, 830 at block 1140. In this way, the quantum entangled photon has interrogated the optically encoded medium 120, 820, and now includes bits of information. As described herein, the quantum entangled single photon, which is now modulated by the optically encoded medium 120, 820 passes through the receiver and eventually coalesces as a single photon at an array of single photon detectors 135, 835 at block 1150. At block 1160, any conventional techniques can be implemented to decode the information from the optically encoded medium 120, 820.

Figure 12:
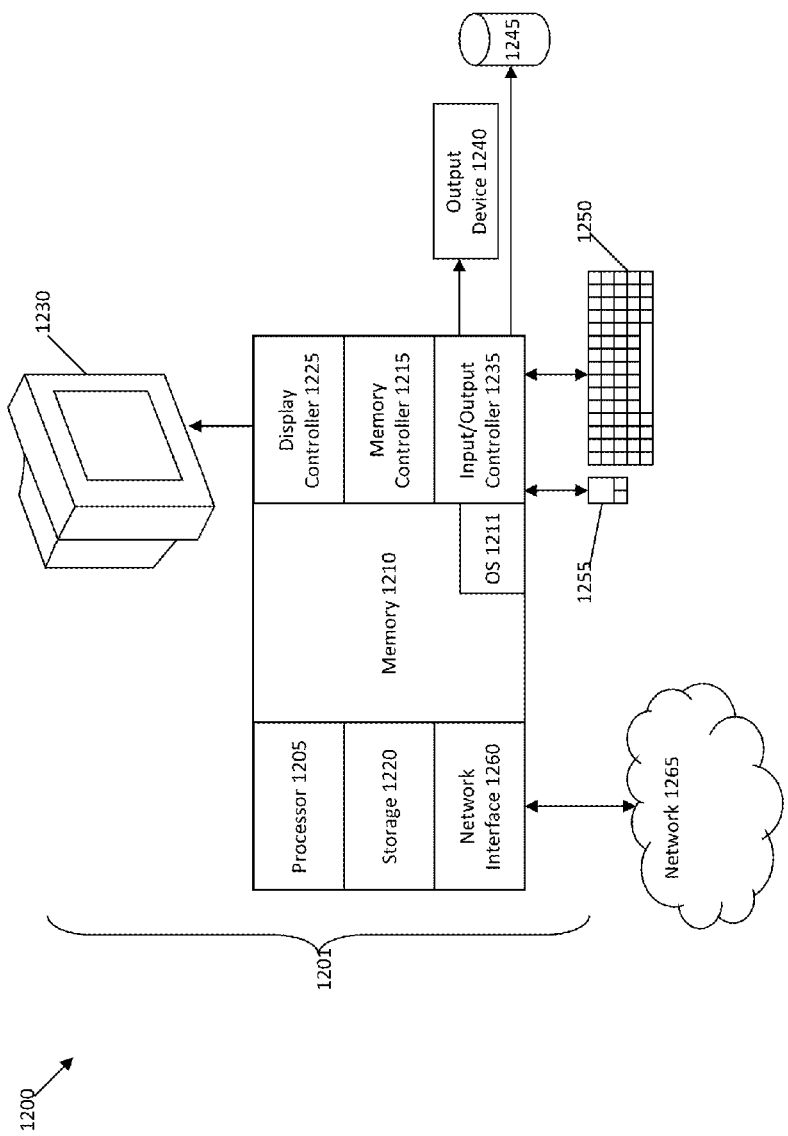
FIG. 12 illustrates an exemplary embodiment of a system that can support the exemplary optical imaging systems and methods as described herein.

The exemplary optical imaging systems described herein can be implemented in any suitable computing or information processing system. FIG. 12 illustrates an exemplary embodiment of a system 1200 that can support the exemplary optical imaging systems and methods as described herein. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1200 therefore includes general-purpose computer 1201.

In exemplary embodiments, in terms of hardware architecture, as shown in FIG. 12, the computer 1201 includes a processor 1205, memory 1210 coupled to a memory controller 1215, and one or more input and/or output (I/O) devices 1240, 1245 (or peripherals) that are communicatively coupled via a local input/output controller 1235. The input/ output controller 1235 can be, but is not limited to, one or more buses or other wired or wireless connections, as is known in the art. The input/output controller 1235 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1205 is a hardware device for executing software, particularly that are stored in memory 1210. The processor 1205 can be any custom made or commercially available processor, a central processing unit (CPU), an auxiliary processor among several processors associated with the computer 1201, a semiconductor based microprocessor (in the form of a microchip or chip set), a macroprocessor, or generally any device for executing software instructions.

The memory 1210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, and/or other types of storage media. Note that the memory 1210 can have a distributed architecture, where various components are situated remote from one another, but can be accessed by the processor 1205.

The software in memory 1210 may include one or more separate programs, each of which comprises an ordered listing of executable instructions for implementing logical functions. In the example of FIG. 12, the software in the memory 1210 includes the optical reading methods described herein in accordance with exemplary embodiments and a suitable operating system (OS) 1211. The OS 1211 essentially controls the execution of other computer programs, such the optical imaging systems and methods as described herein, and provides scheduling, input-output control, file and data management, memory management, and communication control and related services.

The optical reading methods described herein may be in the form of a source program, executable program (object code), script, or any other entity comprising a set of instructions to be performed. When a source program, then the program needs to be translated via a compiler, assembler, interpreter, or the like, which may or may not be included within the memory 1210, so as to operate properly in connection with the OS 1211. Furthermore, the optical reading methods can be written as an object oriented programming language, which has classes of data and methods, or a procedure programming language, which has routines, subroutines, and/or functions.

In exemplary embodiments, a conventional keyboard 1250 and mouse 1255 can be coupled to the input/output controller 1235. Other output devices such as the I/O devices 1240, 1245 may include input devices, for example but not limited to a printer, a scanner, microphone, and the like. Finally, the I/O devices 1240, 1245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1200 can further include a display controller 1225 coupled to a display 1230. In exemplary embodiments, the system 1200 can further include a network interface 1260 for coupling to a network 1265. The network 1265 can be an IP-based network for communication between the computer 1201 and any external server, client and the like via a broadband connection. The network 1265 transmits and receives data between the computer 1201 and external systems. In exemplary embodiments, network 1265 can be a managed IP network administered by a service provider. The network 1265 may be implemented in a wireless fashion, e.g., using wireless protocols and technologies, such as WiFi, WiMax, etc. The network 1265 can also be a packet-switched network such as a local area network, wide area network, metropolitan area network, Internet network, or other similar type of network environment. The network 1265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1201 is a PC, workstation, intelligent device or the like, the software in the memory 1210 may further include a basic input output system (BIOS) (omitted for simplicity). The BIOS is a set of essential software routines that initialize and test hardware at startup, start the OS 1211, and support the transfer of data among the hardware devices. The BIOS is stored in ROM so that the BIOS can be executed when the computer 1201 is activated.

When the computer 1201 is in operation, the processor 1205 is configured to execute software stored within the memory 1210, to communicate data to and from the memory 1210, and to generally control operations of the computer 1201 pursuant to the software. The optical imaging methods described herein and the OS 1211, in whole or in part, but typically the latter, are read by the processor 1205, perhaps buffered within the processor 1205, and then executed.

When the systems and methods described herein are implemented in software, as is shown in FIG. 12, the methods can be stored on any computer readable medium, such as storage 1220, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the optical imaging methods are implemented in hardware, the optical reading methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include the ability of a coherent state transmitter to approach the Holevo bound of the capacity of optical reading in the high photon efficiency low-photon-flux regime, using a binary-phase encoding. Conventionally, a coherent state (laser-light) probe, an on-off amplitude modulation, and signal-shot-noise-limited direct detection (an idealized model for conventional CD/DVD drives), cannot read any more than about 0.5 bits per transmitted photon. In the exemplary embodiments described herein, the photon efficiency achievable by a coherent state probe and BPSK modulation format has no upper limit. However, even with a coherent-state source and binary phase encoding, if the receiver is constrained to detect the reflected light from each memory pixel one at a time followed by classical signal processing (all conventional optical receivers fall in this category), the highest photon efficiency achievable caps off at about 2.89 bits per photon. Thus, JDRs bridge the gap to the Holevo capacity. In order to attain 5 bpp at a probability of word error $P_e^{(M)} \leq 10^{-3}$ it requires to code over $M \sim 2^{35}$ memory pixels, unlike $M \sim 4800$ pixels required by the (unknown) optimal code-JDR pair to attain 5 bpp and $P_e^{(M)} \leq 10^{-3}$ when a coherent state probe is used. Technical effects further include an ability to read $\log_2 M$ bits of data using one single photon in an M-mode spatially-entangled uniform-superposition state, with a binary-phase Hadamard code, and a structured optical receiver, by implementing a W-state transmitter. The optical imaging systems described herein can attain 5 bpp and $P_e^M \leq 10^{-3}$ (even with $P_e^M = 0$) using just M=32 pixels.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An optical imaging system, comprising:
   a transmitter configured to generate spatially entangled quantum states of light to probe reflective targets, wherein the transmitter includes an array of optical mode transformation devices;
   a target configured to reflect the spatially entangled quantum states of light;
   a light source coupled to the transmitter; and
   a receiver configured to receive and detect the spatially entangled quantum states of light to decode a message encoded in a memory, wherein the optical mode transformation devices generate an M mode W-state.

2. The system as claimed in claim 1 where the spatially entangled quantum state of light includes one or more photons.

3. The system as claimed in claim 1 wherein the spatially entangled quantum states of light is configured to pass through the array of optical mode transformation devices to place the spatially entangled quantum states of light in a coherent superposition of multiple phase and spatial locations.

4. The system as claimed in claim 1 wherein the optical mode transformation devices are 50-50 balanced beam splitters.

5. The system as claimed in claim 1 wherein the optical mode transformation devices include a plurality of beam splitters.

6. The system as claimed in claim 5 wherein a number of the plurality of beam splitters in the array of optical mode transformation devices is M−1.

7. The system as claimed in claim 1 further comprising an array of light detectors coupled to the receiver.

8. The system as claimed in claim 7 wherein the receiver includes an array of M log$_2$M/2 beamsplitters.

9. The system as claimed in claim 2 wherein the target is an optically-readable reflective encoded medium.

10. The system as claimed in claim 9 wherein the optically-readable reflective encoded medium uses a binary phase modulation and a Hadamard-code.

11. The system as claimed in claim 9 wherein the spatially entangled quantum states of light is phase modulated upon reflection from the optically encoded medium.

12. An optical imaging system, comprising:
    a light source configured to generate light;
    a W-state transmitter optically coupled to the light source and configured to place the light in a spatially entangled quantum state;
    a binary phase Hadamard coded optical memory in optical communication with the W-state transmitter and configured to modulate the light in the quantum entangled state;
    a receiver configured to coalesce the modulated light in the quantum entangled state from a coherent superposition of multiple spatial locations to a light state into one mode that can be detected; and
    an array of light detectors configured to detect the light state.

13. The system as claimed in claim 12 wherein the transmitted quantum entangled state is a W-state and the return quantum entangled state is a phase-modulated spatially-entangled state.

14. The system as claimed in claim 12 wherein the light is a photon in a Fock state, given by $|1\rangle$.

15. The system as claimed in claim 14 wherein the binary phase Hadamard coded optical memory includes M memory cells.

16. The system as claimed in claim 15 wherein the light that interrogates the M memory cells of the binary phase Hadamard coded optical memory is given by:

$$|W_M\rangle \equiv \frac{|10\ldots 0\rangle + |01\ldots 0\rangle + \ldots + |00\ldots 1\rangle}{\sqrt{M}}.$$

17. The system as claimed in claim 14 wherein upon reflection of the light from the binary phase Hadamard coded optical memory, the light is given by:

$$|W_M\rangle \equiv \frac{|10\ldots 0\rangle - |01\ldots 0\rangle - \ldots - |00\ldots 1\rangle}{\sqrt{M}}.$$

18. An optical reading method, comprising:
    generating light by a light source;
    placing the light in spatially entangled quantum state of light, by a transmitter;
    reflecting the light from an optically encoded medium;
    modulate the light in the entangled quantum state;
    coalescing the modulated light at an array of light detectors in the entangled quantum state from a coherent superposition of multiple spatial locations to a light state into one mode that can be detected, by a receiver; and
    decoding bits of information from the light by a decoder.

19. The method as claimed in claim 18 wherein the light in the entangled quantum state is in a coherent superposition of multiple phase and spatial locations.

20. The method as claimed in claim 18 wherein the light is a photon in a Fock state given by $|1\rangle$.

* * * * *